Dec. 5, 1944. A. A. COLLINS Re. 22,574

CONTROL SYSTEM AND APPARATUS

Original Filed Nov. 8, 1939 5 Sheets-Sheet 1

INVENTOR
Arthur A. Collins,
BY John B. Brady
ATTORNEY

Dec. 5, 1944. A. A. COLLINS Re. 22,574

CONTROL SYSTEM AND APPARATUS

Original Filed Nov. 8, 1939 5 Sheets-Sheet 2

INVENTOR
Arthur A. Collins,
BY
John B. Brady
ATTORNEY

Dec. 5, 1944. A. A. COLLINS Re. 22,574

CONTROL SYSTEM AND APPARATUS

Original Filed Nov. 8, 1939 5 Sheets-Sheet 3

INVENTOR
Arthur A. Collins,
BY John B. Brady,
ATTORNEY

Dec. 5, 1944.
A. A. COLLINS
Re. 22,574
CONTROL SYSTEM AND APPARATUS
Original Filed Nov. 8, 1939
5 Sheets-Sheet 4
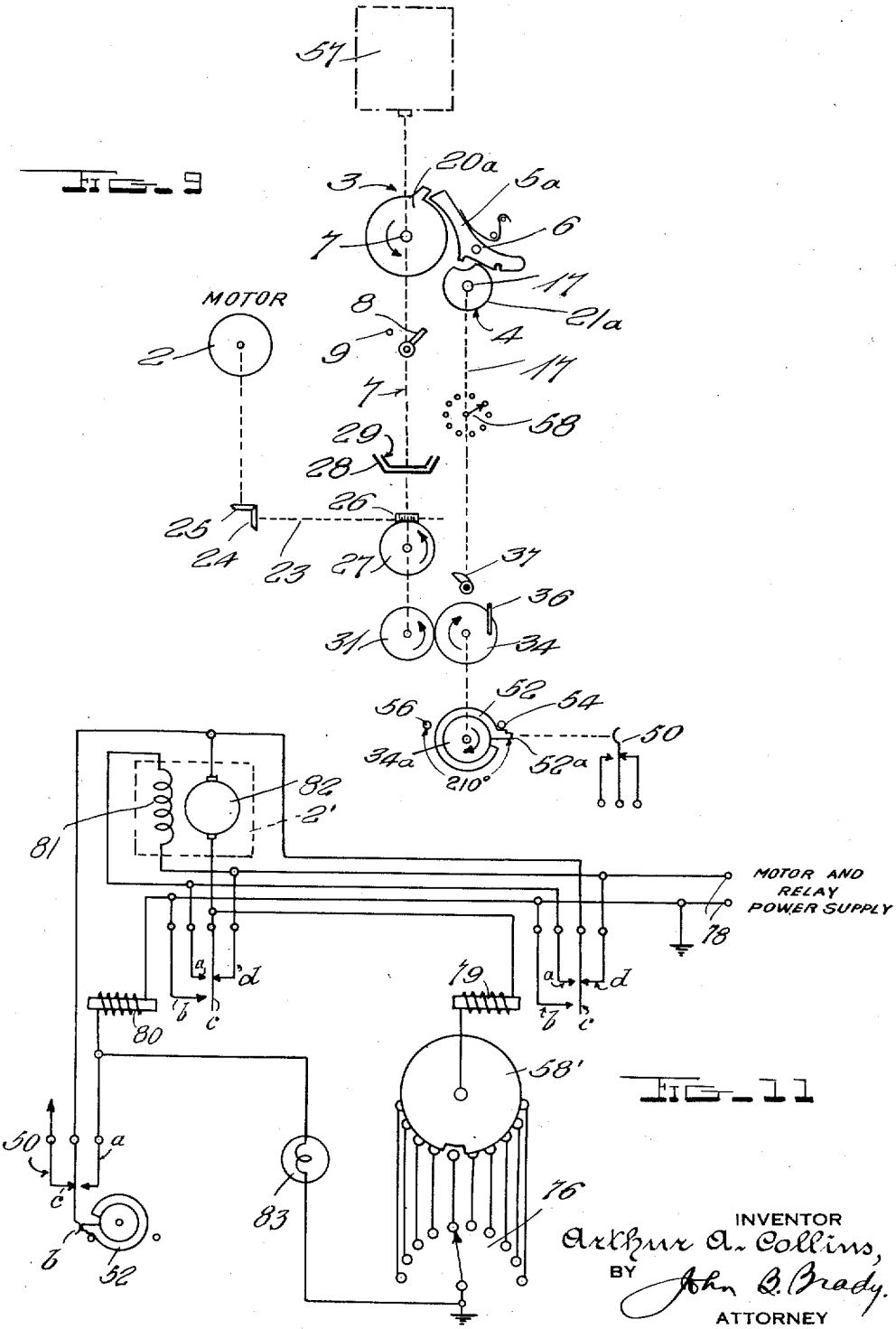
INVENTOR
Arthur A. Collins,
BY
John B. Brady.
ATTORNEY Dec. 5, 1944. A. A. COLLINS Re. 22,574
CONTROL SYSTEM AND APPARATUS
Original Filed Nov. 8, 1939 5 Sheets-Sheet 5
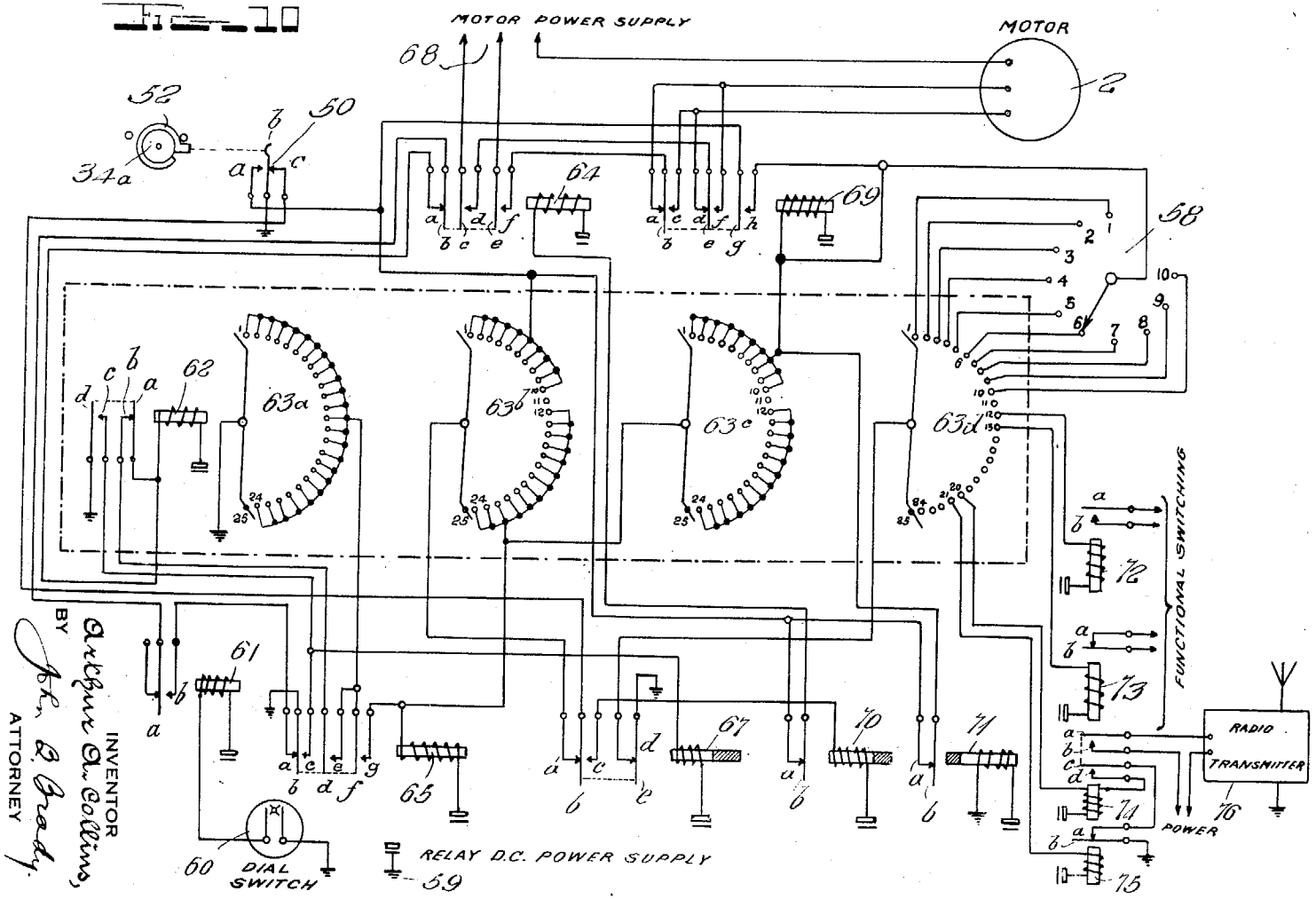
INVENTOR
Arthur A. Collins,
BY John Q. Brady
ATTORNEY Reissued Dec. 5, 1944

Re. 22,574

UNITED STATES PATENT OFFICE 22,574

CONTROL SYSTEM AND APPARATUS

Arthur A. Collins, Cedar Rapids, Iowa

Original No. 2,285,414, dated June 9, 1942, Serial No. 303,491, November 8, 1939. Application for reissue June 2, 1943, Serial No. 489,413

25 Claims. (Cl. 192—142)

My invention is directed broadly to control apparatus and more particularly to a combined shaft positioning and function control system, and apparatus therefor.

One of the objects of my invention is to provide a shaft positioning system of simplified form employing a single motor drive and novel selector cam and stop means.

Another object of my invention is to provide an automatic radio tuning device having an electrical control system combined with means for selectively controlling the functioning of the radio apparatus.

Still another object of my invention is to provide a shaft positioning system with selector cam means and the shaft actuated from a common drive shaft in coordinated relation in a predetermined sequence of operations.

A further object of my invention is to provide a novel construction of shaft positioning means comprising a selector device and shaft driving means in a combination structure including separate slip clutch devices for permitting independent functioning of the selector device and shaft driving means in certain stages of the shaft positioning operation.

A still further object of my invention is to provide an electrical control system for shaft positioning apparatus of the type described for operation by a dial type impulse switch and comprising a minimum of motor and sequence control relays.

Another object of my invention is to provide a shaft positioning system for radio tuning device and an electrical control system therefor operated by a dial type impulse switch and including relay means operative from the same dial type impulse switch for controlling the functioning of the radio apparatus.

A further object of my invention is to provide an electrical control system for a shaft positioning system of the type described operative from a multipoint manual selector switch.

Figure 1:
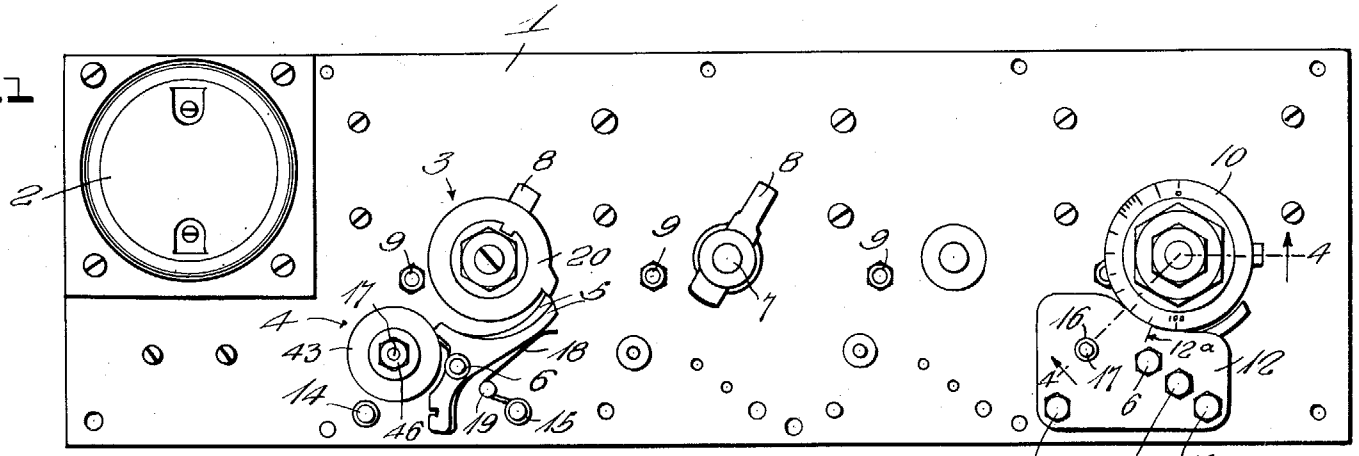
Figure 2:
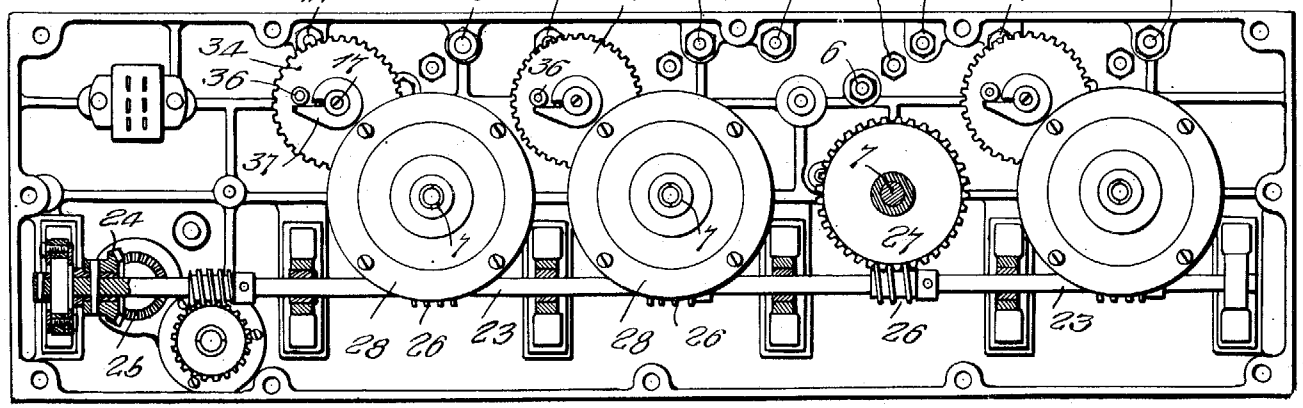
Figure 3:
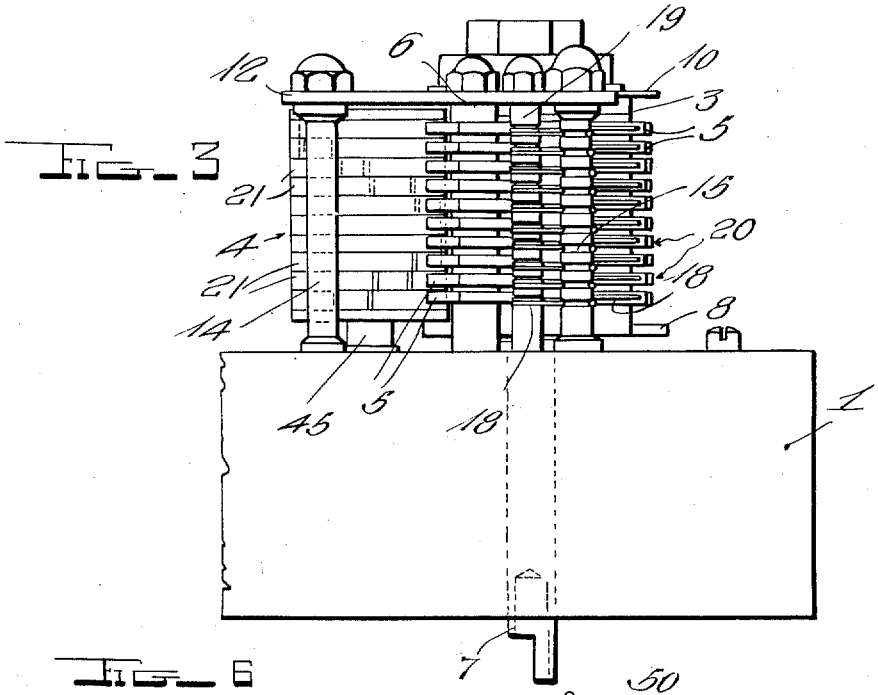
Figure 6:
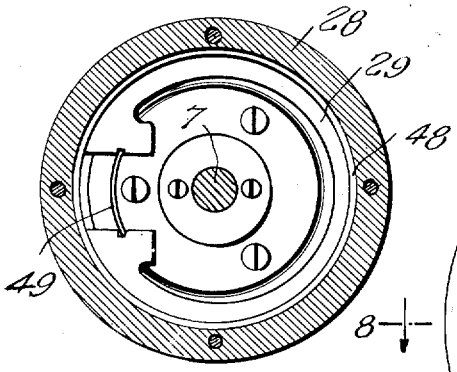
Figure 7:
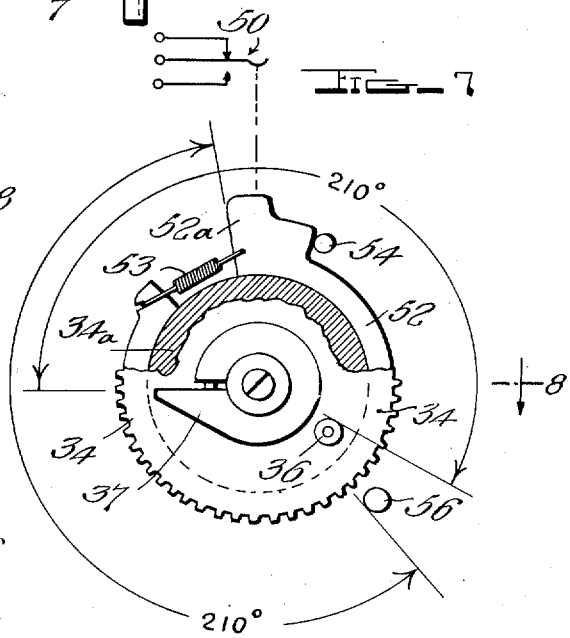
Figure 8:
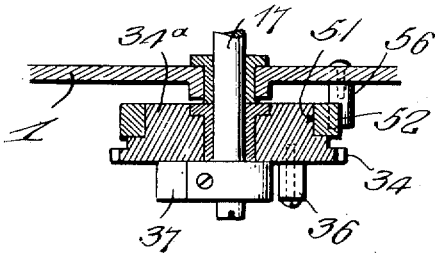
Figure 4:
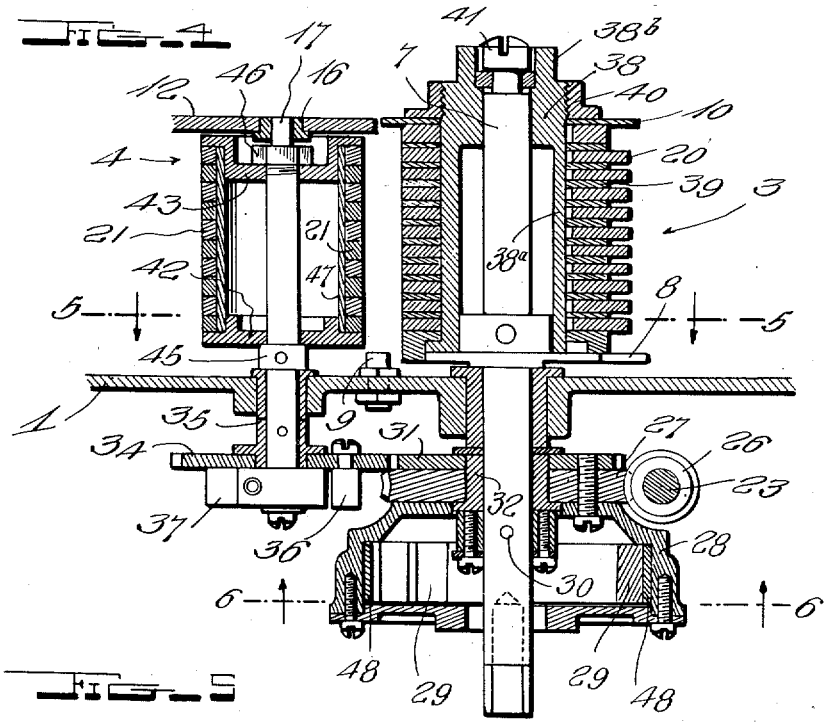
Figure 5:
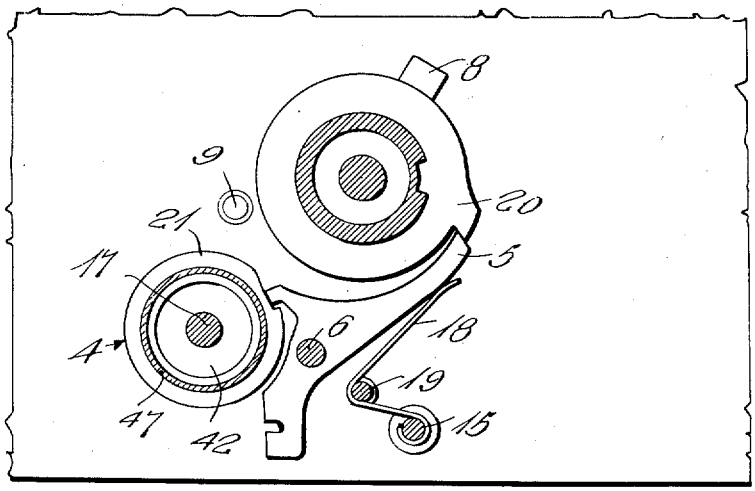

Other and further objects of my invention reside in the apparatus and control systems hereinafter described in more detail, with reference to the accompanying drawings, in which:

Figure 1 is a top plan view of an assembly of a number of shaft positioning devices of my invention adapted for setting the tuning elements of a radio transmitter for operation at selected frequencies, with different devices shown partly in section or disassembled to illustrate the construction; Fig. 2 is a bottom plan view of the assembly shown in Fig. 1 with parts broken away in certain instances to illustrate additional structure; Fig. 3 is a side elevational view of one of the shaft positioning devices supported on the assembly base; Fig. 4 is a vertical sectional view of the selector cam and stop ring drum assembly taken substantially on line 4—4 in Fig. 1; Fig. 5 is a horizontal sectional view taken substantially on line 5—5 in Fig. 4; Fig. 6 is a cross sectional view of the main clutch assembly, taken on line 6—6 in Fig. 4; Fig. 7 is a cross sectional view of the slip clutch mounted in connection with one of the selector cam shafts; Fig. 8 is a detail vertical sectional view taken on line 8—8 in Fig. 7; Fig. 9 is a diagrammatic illustration of the mechanical arrangement in the system of my invention by which the operation may be more clearly understood; Fig. 10 is a schematic diagram of the impulse actuated electrical control system of my invention including function changing means; and Fig. 11 is a schematic diagram of the manual selective electrical control system of my invention.

My invention as disclosed is adapted to a radio transmitter construction having a number of tuning elements each of which has a rotatable shaft to which the shaft positioning device of my invention is connected. All the shafts are simultaneously positioned, each in any one of ten positions independently determined to tune the transmitter to ten different operating frequencies. It will be understood that the number of tuning elements may be varied, and also that the number of different predetermined settings may be more or less than the ten positions provided for in the present embodiment of my invention. The control circuits for operation of the shaft positioning devices are automatic in their functions, and may be operated by means of a dial type impulse switch in one arrangement or a manual selector switch in another arrangement.

A further feature of my invention as adapted to the control of a radio transmitter is the provision of function changing means operative from the same dial type impulse switch employed for automatic tuning. In such arrangement a conditioning operation is effected prior to the operation resulting in a change of function without in any instance affecting the set tuning of the apparatus. The function changes made in the transmitter may be the switching of the power supply "on" or "off," or the switching of the circuits of the transmitter from "CW" to "phone" operation, and vice versa, or similar operational modifications as distinguished from change in frequency which is effected by the shaft positioning features of my invention.

Referring to the drawings in more detail, the assembly shown in Figs. 1 and 2 includes a base 1, preferably of cast metal having internal studs and sections variously adapted to support the bearings, pins and bolts employed in my invention. The upper or outer portion of the base 1, Fig. 1, supports an electric motor 2 and a number of shaft positioning combinations each including a stop-ring drum assembly 3, a cam drum assembly 4, and a series of pawls 5 pivotally mounted on a common stud bolt 6. Each stop-ring drum assembly 3 is mounted on an instrument shaft 7 which has a stop arm 8 rigidly connected therewith and engageable with a stop pin 9 fixed in the base 1 to define a "home" position for the instrument shaft 7. The stop-ring drum assembly 3 has an index dial 10 mounted at the outer end of the assembly on a level with a cover plate 12 which bears an index mark 12*a* correlated with the index markings on the dial 10. The cover plate 12 is supported by stud bolts 14, 15, from the base 1 and contains a bearing 16 for the upper end of a countershaft 17, the shaft of the cam drum assembly 4, and also receives the upper terminus of the stud bolt 6. The pawls 5 mounted on the bolt 6 are individually spring biased by the spring wire elements 18 which pivot on a bar 19, mounted between the base 1 and the plate 12, and are tensioned by bearing on the supporting bolt 15.

There is an individual pawl 5 and coacting spring 18 for each of the stop-rings 20 in the stop-ring drum assembly 3, and a corresponding individual drop cam 21 in the cam drum assembly 4. Fig. 3 illustrates the shaft positioning combination in side elevation as viewed from outside the base 1, and shows the correspondence of individual pawls 5, stop-rings 20 and actuating drop cam elements 21 in the cam drum assembly 4, there being provision for ten different positions of the instrument shaft 7 which carries the stop-ring drum assembly 3.

Within the base 1, Fig. 2, are housed the main drive shaft 23 which is connected with the motor 2 by bevel gears 24, 25, and the individual means by which the several shaft positioning combinations are driven, each including a worm 26 and a worm gear 27 which is connected with the clutch housing 28 as shown more clearly in Fig. 4. Fig. 4 is a vertical sectional view taken on a line passing through both shafts 7 and 17 to illustrate the cooperative action thereof. The shaft 7 to be positioned is driven from the clutch housing by the cooperating clutch member 29 secured to the shaft at the pin 30, the worm gear 27 and an associated spur gear 31 being rotatable with respect to the shaft 7 on the bearing 32 when relative movement takes place between the clutch elements 28 and 29. Spur gear 31 meshes with a coacting spur gear 34 which rotates loosely on the bearing 35 on shaft 17 and carries a pin 36 engageable with a dog 37 which is secured with respect to shaft 17. The shaft 17 is driven by the action of pin 36 against the dog 37, as will be explained in detail.

The stop-ring drum assembly 3 comprises a supporting sleeve member 38 having a key slot 38*a* which receives projections formed on spacers 39 disposed intermediate the stop-rings 20, mounted on the sleeve member 38. The spacers 39 and stop-rings 20, together with the dial 10, are secured on the sleeve member 38 by nut 40 which need only be loosened to permit adjustment of any one or several of the stop-rings 20; the keyed spacers prevent movement of adjacent stop-rings when one is adjusted. The lower end of the stop-ring drum assembly 3 is keyed to engage the arm 8 to prevent relative rotation of the assembly with respect to the shaft 7, and the upper end of the assembly is engaged by a bolt 41 to retain the assembly in position. Other stop-ring drum assemblies 3 may be conveniently substituted for the assembly in position by removing bolt 41 and the sleeve member 38 with its assembled elements, whereupon the substitute stop-ring drum assembly may be mounted in position to afford a different selection of shaft positions according to the calibrated settings of the stop-rings in the substituted assembly. Each stop-ring drum assembly has the sleeve member 38 formed as at 38*b* at the upper end for engagement by a tool for manual tuning of the instrument in the event such operation may be required.

The cam drum assembly 4 comprises end members 42 and 43 mounted between a collar 45 and a nut 46 on shaft 17, with a sleeve 47 and the required number of cams 21 clamped therebetween. Each cam has a drop section for receiving the riding portion of the coacting pawl 5, and the drop sections of the several cams are displaced nominally 30° from adjacent drop sections, a measurement correlated with the spacing of contacts on a control switch to be described, which is driven in synchronism with the shaft 17 and the several cam drum assemblies so that any one contact corresponds to the operating position of one pawl in each of the shaft positioning combinations.

The clutch elements 28 and 29 constitute a torque limiting drive and provide a slip clutch which allows the drive means to continue after the shaft is positioned. The drive for the stop-ring drum may continue to run after a given unit has positioned, thus allowing several units to be operated by a single drive.

Fig. 5 illustrates the operated position of one pawl 5*a* under the action of spring 18*a*, with the drop cam 21*a* in position to permit the pawl to move into the path of stop-ring 20*a*.

Fig. 6 is a sectional view of the main drive clutch on shaft 7, Fig. 4, and shows the form of the clutch member 29 within the housing 28. A clutch lining is provided at 48. The clutch is of the wrapping or tangential type so devised that the turning force tends to unwrap the flexible clutch band 29 against the fixed tension of a spring 49, arranged to maintain the flexible clutch band 29 in contact with the clutch lining 48. The maximum turning force obtainable is equal to the spring tension; and the minimum is dependent upon the coefficient of friction and the arc of contact of the clutch facings, but such minimum force is designed to be more than adequate to turn the instrument connected with shaft 7.

Figs. 7 and 8 illustrate a secondary slip clutch, also of the wrapping or tangential type, employed in connection wtih the main drive shaft 23, Fig. 2, preferably through the worm and worm gears 26, 27, and spur gears 31 and 34 of one of the shaft positioning combinations, to control the operation of a limit switch 50 which functions to terminate the automatic operation of the system as will be described. Fig. 8 shows one arrangement by which the clutch may be combined with a modified form of the spur gear 34, but it will be understood that by suitable gear ratios the clutch may be separately driven from the main drive shaft 23, or motor 2, to operate switch 50.

As illustrated in Figs. 7 and 8, the gear 34 is provided with an upstanding portion 34a having a peripheral clutch facing 51. Pin 36, dog 37 and shaft 17 are in the same relation as above described in connection with Fig. 4. An outer ring 52 provides a coacting clutch surface engaged with the clutch facing 51. The ring 52 is essentially flexible and is held in contact with the clutch facing 51 by the action of spring 53. The ring 52 has an extended lug portion 52a engageable upon rotation in opposite directions with one or the other of stop pins 54 and 56. The position shown is the normal resting position of the clutch ring 52, the lug portion 52a being in abutment with stop pin 54, in which position the limit switch 50 is actuated by means connected with the lug portion 52a to stop the driving motor. Movement of the clutch ring 52 is limited to an arc of approximately 210°, arbitrarily selected as adequate to permit all instrument shafts in the system to be turned to set positions since such shafts ordinarily have a 180° range of variation. The limit of movement of the clutch ring 52 is determined by the position of stop pin 56 relative to the pin 54, which may be varied as required. The stop pins 54 and 56 are conveniently supported in the base 1 in the arrangement shown in Fig. 8.

Referring now to the diagrammatic illustration of the mechanical arrangement as shown in Fig. 9, the operation may be described in two main phases, forward and reverse operation of motor 2. In the forward operation are two steps: first, return of the stop-ring drum assembly 3 to "home" position; and second, movement of the cam drum assembly 4 to selected position. In the reverse operation are two steps also: first, advance of the stop-ring drum assembly and its respective instrument shaft to set position; and second, continuation of the motor drive to a predetermined limit to condition the apparatus for subsequent operations.

In the forward operation, motor 2 drives worm gear 27 through gears 25 and 24, shaft 23 and worm 26, in the direction indicated by the arrow. Gear 31 and clutch element 28 are simultaneously rotated. Clutch element 29 follows element 28 and drives shaft 7 counterclockwise, as viewed in Fig. 1, until stop arm 8 engages stop pin 9 with the stop-ring drum assembly 3 in "home" position. The instrument, indicated at 57, is connected with and rotated as is shaft 7. At the same time, gear 31 drives gear 34 in clockwise direction, pin 36 moving in the clear through an arc of 210° while clutch ring 52 follows the movement of gear 34 also through an arc of 210°, as best illustrated in Fig. 7. By this time shaft 7 is prevented from further counterclockwise movement by pin 9, and the clutch ring 52 is stopped by pin 56. Motor 2 continues to drive gears 27, 31 and 34, however, with the clutches slipping, to move pin 36 against the dog 37 to drive shaft 17 and the cam drum assembly 4. Coupled with shaft 17 is a tap switch 58, electrically connected in a control circuit as will be described and operative upon location on a selected contact to reverse the direction of rotation of motor 2. At this point, the cam drum assembly is set in accordance with the selected contact on the tap switch and one of the pawls 5a is dropped for engagement with the corresponding stop ring 20a. It will be remembered that the various cam elements 21, as described, are positioned in correlation with the spacing of the contacts on the tap switch 58, so that each contact corresponds to a pawl 5 and the selection of a contact means the operation of the corresponding pawl for engagement by the corresponding adjusted stop ring to establish the shaft 7 in a desired predetermined position.

Upon operation of switch 58 through the selected contact, motor 2 is reversed and pin 36 moves away from the dog 37, leaving switch 58 and the cam drum assembly 4 in selected position, and the clutch ring 52 also moves away from stop 56. The reverse movement is limited to 210° at the clutch ring 52 by engagement at that limit of the lug 52a with pin 54 and the operation of the limit switch 50 which disconnects the power supply to motor 2. During this limited reverse movement, however, clutch elements 28 and 29 again rotate together, clockwise, stop arm 8 moves away from pin 9 and the stop-ring drum assembly and the instrument 57 move to set position with stop-ring 20a engaged with the selected pawl 5a. For the remainder of the 210° range of movement, clutch elements 28, 29, slip and only gears 27, 31 and 34, with clutch ring 52 are driven at the conclusion of the cycle.

Various automatic circuit arrangements may be devised for control of the apparatus thus described and I have disclosed two such arrangements as part of my invention; one is an automatic circuit initiated in operation by current impulses from a dial type switch and includes further specific features, and the other is a simplified circuit initiated in operation by direct manual selection of an operating circuit.

Referring to Fig. 10, the various devices illustrated schematically are of conventional form; the relays, dial and rotary switches are of types used in telephone circuits and may be arranged in compact form in a minimum of space. The source of power for the relays is shown as having one terminal grounded at 59, and the other terminal variously connected with the several relays the circuits of which are completed in accordance with the desired sequence of operations. Reference character 60 designates a dial type impulse switch capable of sending any number of impulses between one and eleven, inclusive. An impulse relay 61 is controlled by the impulse switch 60, and its contacts 61a—b operate the stepping magnet 62 of a four-bank, twenty-five position rotary switch, 63a, 63b, 63c, 63d, through a circuit from the magnet 62 through normally closed contacts 64a—b of a motor starting relay 64, the contacts 61a—b of the impulse relay 61, and normally closed contacts 65a—b of a homing relay 65, to ground.

The stepping magnet 62 has back contacts 62a—b connected in an auxiliary circuit from the magnet 62 through contacts 65d—e of the homing relay 65, and the contacts of switch bank 63a to ground, for stepping the switch banks 63a—d to home position by self impulsing upon operation of relay 65. The stepping magnet also has contacts 62c—d for operating a slow release disconnect relay 67 upon the start of a cycle of operation of the system.

Motor 2 is illustrated as a three-phase motor energized from an appropriate source connected at 68 with circuits through contacts 64c—d and 64e—f of motor starting relay 64, and through contacts 69a—b—c and 69d—e—f of a motor reversing relay 69. Relay 64 is energized by the circuit from the relay through contacts 70a—b of a time delay relay 70 and the contacts 1–10 on switch bank 63b, to ground; and relay 64 has a holding circuit paralleled with the contacts of switch bank 63b at contacts 50a—b of limit switch 50 which are closed after the motor has started. Motor reversing relay 69 is energized by the circuit from the relay through the motor driven selector switch 58, switch bank 63d, and contacts 67d—e of disconnect relay 67, to ground; and relay 69 has a holding circuit through its own contacts 69g—h to ground through the limit switch 50.

Homing relay 65 is energized simultaneously with the motor reversing relay 69 by connection from the relay 65 through switch bank 63c to relay 69 and thence through the same circuit therefrom through switch 58, switch bank 63d, and contacts 67d—e to ground. Relay 65 has a holding circuit through its own contacts 65f—g and the switch bank 63a to ground, releasing when the rotary switch 63a—d has returned to home position, shown.

Disconnect relay 67 is energized by stepping magnet contacts 62c—d as described, and holds over between and after the stepping impulses by virtue of its slow release operation. Relay 67 is also operated upon the operation of homing relay 65 through contacts 65c—b thereof. Relay 67 operates to disconnect ground from the switch bank 63b through its contacts 67a—b and from switch bank 63d through its contacts 67d—e, while stepping operations take place in the rotary switch to prevent false operation of interconnected circuits.

Time delay relay 70 is energized through contacts 67c—b of the disconnect relay 67, and is a slow release relay the contacts of which are interposed in the circuit of the motor starting relay 64 to prevent false operation of the relay 64 and motor 2 when the rotary switch is impulsed to the same position for which the circuits are already conditioned, that is, where switch 58 affords a circuit for the reversing relay 69 and the homing relay 65, and the momentary pause introduced by relay 70 allows relay 65 to operate and the system to return to rest without operations is effected, as hereinbefore described.

An additional circuit for motor reversing relay 69 is provided for in contacts 71a—b of a slow operating relay 71 connected directly across the power supply. The circuit is from relay 69 through contacts 71a—b and through contacts 50a—b of the limit switch 50 to ground. The function of the relay 71 is to prevent false operation of the motor relays in case of a power interruption where, should it occur after the rotary switch 63a—d had been "homed" but before the cycle had been completed, only relay 64 would operate when power was restored and the motor would continue to run indefinitely if relay 71 were not used. No impulses can be received by magnet 62 while relay 64 is operated, contacts 64a—b being open. Relay 69 is reoperated therefore through the normally closed contacts 71a—b and establishes its holding circuit through contacts 69g—h before relay 71 operates. In the normal usage of the system, relay 71 operates while the rotary switch is stepped to the dialed position, and substantially before relays 67 and 70 are released to operate relay 64 and motor 2 to close the contacts 50a—b of the limit switch, so that its presence does not affect the normal operation of the system.

It will be noted that the shaft positioning system of ten possible selections utilizes only the contacts 1–10 inclusive of the rotary switch bank 63d. Contact 11 is open on each bank 33b, 63c, and 63d, but joined in the common connection through contacts 1–24 in the bank 63a for self-stepping the rotary switch to "homed" position, shown, contact 25 being reserved in all banks for the home position. Contacts 12–24 of bank 63b are joined for operating the homing relay 65 in this phase of the system, the circuit being from the relay through the switch bank 63b and contacts 67a—b of relay 67, and through contacts 50c—b of the limit switch 50 which is not operated in this phase of the system. Contacts 12–24 of switch bank 63c are not employed.

Contacts 12–22 of switch bank 63d, however, are available for operation of various relay circuits adaptable for auxiliary purposes such as change of function in a radio transmitter where the same impulse relay system is employed in an automatic arrangement for tuning the transmitter on a selected frequency, ten of which may be provided. In Fig. 10, I have shown relay 72 energized by the circuit through contact 63d—12 and contacts 67d—e to ground, with the contacts 72a—b adapted to close upon operation of the relay 72. A similar circuit may energize relay 73, through contact 63d—13, whereby contacts 73a—b are adapted to be opened. A similar circuit may be employed to energize relay 74, through contact 63d—20, with contacts 74a—b adapted to be closed and contacts 74c—d arranged to establish a holding circuit for relay 74 through contacts 75a—b of a separate relay 75. Relay 75 in turn may be operated by a similar circuit, through contact 63d—21 for opening contacts 75a—b and releasing relay 74. These latter two relays 74, 75, may be employed to control the application of power to and the disconnection of power from the radio transmitter 76 at the beginning and end, respectively, of periods of operation, as indicated.

For operation of the motor 2 to set the instrument shaft or shafts in a desired position by means of the dial controlled system illustrated in Fig. 10, the proper number of impulses is produced by dialing, say #6, at the switch 60. Each of the four switch banks 63a—d steps up to contact #6, and simultaneously relay 67 has been operated to open the circuits through banks 63b and 63d, and relay 70 is operated to prevent immediate operation of motor starting relay 64. When the switch banks are in established positions, relays 67 and 70 open after a momentary delay and motor starting relay 64 is operated to energize the motor 2 to drive in the forward direction, Fig. 9. The first main phase of the mechanical operations is then effected as hereinbefore described, ending with the closing of switch 58 on the selected contact, #6 in the example taken. Motor reversing relay 69 is then operated, and the second main phase of the mechanical operations is effected, as heretofore described.

As the motor 2 is energized and begins to turn, the movement of clutch ring 52 throws the limit switch 50 to close the holding circuits for the motor relays 64 and 69. At the time switch 58 is stopped on the selected contact, #6, and motor reversing relay 69 is operated, the homing relay 65 is also operated and the circuit to the stepping magnet is completed at the contacts 65d—e to return the rotary switch to starting or home position. Relay 67 is again operated to open the circuits through banks 63b and 63d to prevent false connections. Relays 64 and 69 remain operated while the motor continues its reverse running and release when the limit switch 50 is operated at the conclusion of the second main phase of the mechanical sequence, whereupon the circuits are in condition for the next cycle of operation.

Where it is desired to operate one of the auxiliary relays 72—75 or the circuits connected to any of the contacts in the switch bank 63*d* between #12 and #22, inclusive, a first dialing operation is performed to produce eleven impulses to set the switch banks on the open contacts #11 in the banks 63*b*, 63*c* and 63*d*. Relays 67 and 70 operate as before during this function and the motor relay circuits are not affected. Then the impulses required for the desired operation are produced at switch 60, say nine, which will step the rotary switches up to contacts #20. Relays 67 and 70 subsequently release, homing relay 65 being operated through switch bank 63*b*, contacts 67*a*—*b* of relay 67, and contacts 50*c*—*b* of limit switch 50, whereupon the rotary switch steps up to starting or home position. Release of relay 70 is uneventful, as the circuit to the motor starting relay 64 is open at the switch bank 63*b*; the circuit to the motor reversing relay 69 is open at the switch bank 63*c*, the contacts #12–24 of which are isolated from the contacts #1–10. The circuit to relay 74 is completed through contact 63*d*—20 and contacts 67*d*—*e* of relay 67, before the self-stepping action at switch bank 63*a* returns the rotary switch to home position.

The schematic diagram of Fig. 11 illustrates the simplified circuit for automatic operation of the shaft positioning system under control of a manual selector switch 76. This arrangement is preferable in certain applications, as in aircraft radio apparatus, where weight and bulk are pertinent factors. The motor 2′ in Fig. 11 is a direct current motor connected with the same source of power which supplies the relays with energy, through terminals 78. The limit switch 50 is essentially the same as that employed in the system of Fig. 10. A motor starting relay 79 and a motor reversing relay 80 together with a modified motor driven selector switch 58′ complete the system elements.

The motor 2′ comprises a field winding 81 and an armature 82. The field winding is connected directly to one terminal 78 at one end, and through contacts 79*a*—*b* or contacts 80*a*—*b* to the other terminal at the opposite end, depending upon which relay 79 or 80, is operative. The armature 82 has its terminals connected with relay tongues 79*c* and 80*c* through which the armature may be connected with terminals 78 for forward or reverse operation depending upon which relay, 79 or 80, is operative. Relay 79 is normally connected at one terminal through contacts 80*c*—*d* with the power source and at the other terminal through the motor driven selector switch 58′ and the manual selector switch 76 to ground, which completes the circuit. The motor driven selector switch 58′ is formed to contact all but one of a series of coacting contacts which are connected with the contacts of the manual selector switch 76.

When switch 76 is placed on a contact other than that for which the apparatus has previously been operated, the relay 79 is energized by the circuit through both switches 76 and 58′ and motor 2′ operates in the forward direction of Fig. 9 to effect the first main phase of the mechanical operation, ending with switch 58′ breaking the circuit at the contact corresponding to the selected contact in the manual selector switch 76. Relay 79 is thus deenergized, which closes contacts 79*c*—*d* and not only connects the motor armature 82 to the opposite terminal of the source but also completes a circuit through relay 80 from the other terminal of the source, a circuit which has been conditioned by the closing of contacts 50*a*—*b* at the limit switch when motor 2′ began to run. Operation of relay 80 completes the motor circuit for reverse operation through contacts 80*a*—*b*—*c*, and the second main phase of the mechanical cycle of operation is effected as described in connection with Fig. 9, at the conclusion of which limit switch 50 is opened and relay 80 is deenergized with the system in starting condition. A pilot lamp 83 is provided in shunt with the relay 80 for indicating its energization; the lamp 83 is disconnected with relay 80 by limit switch 50 and thus indicates the termination of the setting operation so that the controlled apparatus may then be utilized.

When the system of Fig. 11 is employed for tuning a radio transmitter, as disclosed, the opposite contact 50*c* of the limit switch 50 may be employed in a circuit including means operative to eliminate radio frequency carrier current from the antenna during the tuning operation.

While I have described my invention in certain preferred embodiments I desire it understood that modifications may be made both in the apparatus and the control circuits therefor within the scope of my invention, and that no limitations upon my invention are intended except as are imposed by the appended claims.

What I claim as new and desire to secure by Letters Patent of the United States is as follows:

1. Shaft positioning apparatus comprising, in combination, a shaft to be positioned, a torque limiting drive for said shaft, a stop-ring drum assembly mounted on the shaft to be positioned and including a series of stop rings each having a stop device thereon, a cam drum assembly, a series of pawls disposed between said stop-ring drum assembly and said cam drum assembly, biasing means for each of said pawls, each pawl being individually actuated by said biasing means for engagement with the stop device of a corresponding individual stop ring, and means for driving said cam drum assembly and said stop-ring drum assembly in a predetermined sequence of operations for actuating a selected pawl and for moving the stop device of a corresponding stop ring into engagement therewith for setting said shaft in desired angular position.

2. Shaft positioning apparatus comprising, in combination, a shaft to be positioned, a torque limiting drive for said shaft, a stop ring mounted in adjusted relation on the shaft to be positioned, a stop device on said stop ring, a cam mounted in alignment with said stop ring, a pawl disposed between said stop ring and said cam, means for biasing said pawl, said pawl being movable under control of said means into the path of the stop device on said stop ring, and means for driving said cam for effecting movement of said pawl under control of said means to operative position and for driving the stop device on said stop ring into engagement with said pawl for setting said shaft in desired angular position.

3. Shaft positioning apparatus comprising, in combination, a shaft to be positioned, a countershaft, slip clutch drive means for said shaft, dog and pin drive means for said countershaft, motor means operative in a forward direction for driving both said shafts through the respective drive means, said motor means being reversible for driving only said shaft to be positioned, a plurality of differently adjusted stop means disposed between said shafts, means for effecting selection of one of said stop means operative from said countershaft, means for reversing said motor drive means, and means for moving said shaft to be positioned, in reverse and independently of said countershaft, to set position as determined by the selected stop means.

4. Shaft positioning apparatus as set forth in claim 3 with stop means connected with said shaft to be positioned for limiting the extent of movement thereof during the forward direction of operation of said motor means.

5. Shaft positioning apparatus as set forth in claim 3 with automatic selective means driven in synchronism with said countershaft and operative to control said reversing means.

6. Shaft positioning apparatus as set forth in claim 3 and including switch means connected with said motor means for terminating the operation thereof, and means for actuating said switch means coupled with said motor means and operated through a predetermined range of movement in the reverse operation of said motor means for actuating said switch means at the limit of said predetermined range of movement.

7. Shaft positioning apparatus as set forth in claim 3 with said plurality of differently adjusted stop means disposed between said shafts including a series of stop rings each adjusted to a selected position, a corresponding series of pawls individually engageable by the respective stop rings, and cam means for individually and selectively controlling the operation of said pawls.

8. Shaft positioning apparatus as set forth in claim 3 with said plurality of differently adjusted stop means including a series of stop rings each adjusted to a selected position mounted on said shaft to be positioned, a corresponding series of pawls individually engageable by the respective stop rings and collectively mounted independently of said shaft and said countershaft, and coacting cam means mounted on said countershaft for individually and selectively controlling the operation of said pawls.

9. Shaft positioning apparatus comprising a base, a shaft to be positioned and a countershaft rotatably mounted in said base in cooperable relation, a stop-ring drum assembly mounted on said shaft and a cam drum assembly mounted on said countershaft above said base, a series of spring actuated pawls pivotally mounted with respect to said base intermediate said stop-ring and said cam drum assemblies with said pawls riding on said cam drum assembly and individually controlled thereby for selective operation with respect to said stop-ring drum assembly, slip clutch drive means mounted on said shaft beneath said base, dog and pin drive means mounted on said countershaft beneath said base, and means for actuating both said drive means in common including a drive shaft beneath said base and motor means mounted on said base and connected with said drive shaft.

10. Shaft positioning apparatus comprising a base, a shaft to be positioned and a countershaft rotatably mounted in said base in cooperable relation, a stop-ring drum assembly mounted on said shaft and a cam drum assembly mounted on said countershaft above said base, a series of spring actuated pawls pivotally mounted with respect to said base intermediate said stop-ring and said cam drum assemblies with said pawls riding on said cam drum assembly and individually controlled thereby for selective operation with respect to said stop-ring drum assembly, a slip clutch for driving said shaft including a driving element mounted on said shaft and rotatable with respect thereto, a worm gear and a spur gear mounted on said driving clutch element and rotatable therewith, drive means coupled with said worm gear including a motor mounted on said base and a worm drive shaft interconnecting said motor and said worm gear, a second spur gear meshed with the first said spur gear and mounted on and rotatable with respect to said countershaft, and drive means for said countershaft including a driving pin mounted on said second spur gear and a coacting driven dog secured to said countershaft.

11. Shaft positioning apparatus comprising, in combination, a shaft having a plurality of stop means connected therewith, a clutch drive for said shaft, selector cam means for actuating one of said stop means, reversible drive means common to both said shaft and said selector cam means and operable to drive both said shaft and said selector cam means in the forward driving direction, and said shaft only in the reverse driving direction, and an electric control system connected with said drive means and operative for reversing said drive means, said electric control system including selector switch means and coacting tap switch means driven in synchronism with said selector cam means for establishing a control circuit for reversing said drive means.

12. In radio signalling apparatus, a plurality of control shafts, a set of position-determining means adjustably mounted on each of said shafts, stop means associated with each set of position-determining means, selector means for simultaneously rendering a predetermined stop means operative to cooperate with a predetermined position-determining means in each set in accordance with the desired positions of said shafts, and single means for driving said shafts to bring each thereof to a position determined by the adjustment of the position-determining means on their respective shafts.

13. In radio signalling apparatus, a plurality of control shafts, a set of position-determining means for each of said shafts, the position-determining means for each of said shafts being adjustably mounted thereon, stop means cooperating with each set of position-determining means, a selector device carrying a plurality of means for rendering a selected stop means operative to cooperate with a predetermined position-determining means in accordance with the desired positions of said shafts, and a common drive mechanism for said shafts, said drive mechanism being coupled thereto through a slip-clutch device.

14. The arrangement described in claim 13 characterized by that said control shafts are positioned on axes that are parallel with the axis of said stop means.

15. The arrangement described in claim 13 characterized by that said means for setting the stop means comprises a cylindrical rotary member provided with a plurality of stop operating means projecting beyond the cylindrical surface thereof.

16. In radio signalling apparatus, a plurality of control shafts, a set of independently adjustable devices carried by each shaft, each device determining the position to which its shaft is to be adjusted, a stop member associated with each adjustable device but normally disengaged therefrom, a selector member having a plurality of positions of adjustment, spring means continuously biasing said stop member for engagement with a selected adjustable device and means for actuating said shafts whereby each thereof is rotated until stopped by engagement of the adjustable device with its associated stop member.

17. In apparatus according to the invention defined in claim 16 wherein a slip clutch is provided between the actuating means and each control shaft to permit the several shafts to be stopped in their final adjusted positions at different times.

18. Shaft positioning apparatus comprising, in combination, a shaft to be positioned, a torque limiting drive for said shaft, a stop-ring drum assembly mounted on the shaft to be positioned and comprising a plurality of stop rings each containing a stop projection thereon, a cam drum assembly, a series of pawls disposed between said stop-ring drum assembly and said cam drum assembly, each pawl being individually actuated by a separate spring in coaction with a selected cam in said cam drum assembly for engagement with the stop projection of a corresponding individual stop ring, and means for driving said cam drum assembly to positions whereby the associated springs actuate a selected pawl for coaction with the stop projection of a corresponding stop ring for setting said shaft in desired angular position.

19. Shaft positioning apparatus comprising, in combination, a shaft to be positioned, a torque limiting drive for said shaft, a stop ring mounted in adjusted relation on the shaft to be positioned, a stop projection on said stop ring, a cam mounted in alignment with the stop projection on said stop ring, a pawl disposed between the stop projection, said stop ring and said cam and movable under control of said cam into the path of the stop projection on said stop ring, spring means for actuating each pawl, means for driving said cam for effecting movement of said pawl under control of the associated spring means to operative position in connection with said stop ring for setting said shaft in desired angular position.

20. Shaft positioning apparatus comprising, in combination, a shaft to be positioned, a torque limiting drive for said shaft, a stop-ring drum assembly mounted on the shaft to be positioned including a plurality of stop rings each having a stop device thereon, a cam drum assembly, a series of pawls disposed between said stop-ring drum assembly and said cam drum assembly, a spring device individual to each of said pawls each pawl being individually controlled by a separate cam in said cam drum assembly by the associated spring device for engagement with the stop device of a corresponding individual stop-ring, and means for driving said cam drum assembly and said stop-ring drum assembly to positions whereby the associated springs actuate a selected pawl for abutment with the stop device of the corresponding stop-ring for setting said shaft in desired angular position.

21. Shaft positioning apparatus comprising, in combination, a shaft to be positioned, a torque limiting drive for said shaft, a stop-ring drum assembly mounted on the shaft to be positioned and comprising a plurality of stop rings each containing a stop device thereon, a cam drum assembly, a series of pawls disposed between said stop-ring drum assembly and said cam drum assembly, spring devices associated with said pawls each pawl being individually actuated by a separate spring device for engagement with the stop device of a corresponding individual stop-ring, and means for driving said cam drum assembly and said stop-ring drum assembly in proper sequence for setting said shaft in desired angular position.

22. Shaft positioning apparatus comprising, in combination, a shaft to be positioned, a torque limiting drive for said shaft, a stop-ring mounted in adjusted relation on the shaft to be positioned, a stop device on said stop ring, a cam mounted in alignment with said stop-ring, a pawl disposed between said stop-ring and said cam, spring means associated with said pawl for moving said pawl under control of said cam into the path of said stop-ring, and means for driving said cam for effecting movement of said pawl under activation by said spring means into the path of the stop device on said stop-ring for setting said shaft in desired angular position.

23. Shaft positioning apparatus comprising, in combination, a shaft to be positioned, a torque limiting drive for said shaft, a stop-ring drum assembly comprising a series of stop rings mounted on the shaft to be positioned, a stop projection on each of said stop rings, a cam drum assembly including a series of cams, a series of pawls disposed between said stop-ring drum assembly and said cam drum assembly, a spring device associated with each of said pawls each pawl being individually actuated by the associated spring device under control of said cams for engagement with the stop projection on a corresponding individual stop-ring, means for driving said cam drum assembly for effecting activation of a selected pawl under control of the associated spring device, and determining the limit of movement of said stop-ring drum assembly by the locking engagement of the selected pawl with the stop projection of the corresponding stop ring for setting said shaft in desired angular position.

24. Shaft positioning apparatus comprising, in combination, a shaft to be positioned, a torque limiting drive for said shaft, a stop-ring mounted in adjusted relation on the shaft to be positioned, a stop device on said stop ring, a cam mounted in alignment with the stop device on said stop-ring, a pawl disposed between said stop-ring and said cam and pivoted intermediate the ends thereof, a spring associated with the pawl for moving the pawl under control of said cam into the path of the stop device on said stop-ring, means for driving said cam for effecting movement of said pawl under activation by said spring, and means for driving the stop device on said stop-ring into locking engagement with said pawl for setting said shaft in desired angular position.

25. Shaft positioning apparatus comprising, in combination, a shaft to be positioned, a torque limiting drive for said shaft, a stop-ring drum assembly mounted on the shaft to be positioned comprising a series of stop rings each including a stop device thereon, a cam drum assembly, a series of pawls disposed between said stop-ring drum assembly and said cam drum assembly, spring means individual to each of said pawls each pawl being individually actuated by said spring means for engagement with the stop device of a corresponding individual stop-ring, and means for driving said cam drum assembly and said stop-ring drum assembly in proper sequence for actuating a selected pawl and for moving the stop device of the corresponding stop ring into locking engagement therewith for setting said shaft in desired angular position.

ARTHUR A. COLLINS.